US006378046B1

(12) United States Patent
Bellers et al.

(10) Patent No.: US 6,378,046 B1
(45) Date of Patent: Apr. 23, 2002

(54) CACHE WITH ACCESS TO A MOVING TWO-DIMENSIONAL WINDOW

(75) Inventors: Erwin B. Bellers; Alphonsius A. J. De Lange, both of Eindhoven (NL)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/469,452

(22) Filed: Dec. 21, 1999

(30) Foreign Application Priority Data

Dec. 22, 1998 (EP) .......................................... 98204381

(51) Int. Cl.[7] .................................................. G06F 2/08
(52) U.S. Cl. ....................................... 711/133; 711/134
(58) Field of Search ................................ 711/133, 128, 711/3, 200, 134; 345/552, 557, 686, 687

(56) References Cited

U.S. PATENT DOCUMENTS 5,539,873 A * 7/1996 Yoshimori et al. .......... 395/163
5,696,698 A 12/1997 Herluison et al. ...... 364/514 A
6,247,084 B1 * 6/2001 Apostol, Jr. et al. ........ 710/108

FOREIGN PATENT DOCUMENTS

EP 0877338 A2 * 11/1998 ............. G06T/3/40

* cited by examiner

*Primary Examiner*—Matthew Kim
*Assistant Examiner*—Stephen Elmore
(74) *Attorney, Agent, or Firm*—Edward W. Goodman

(57) ABSTRACT

A processor is programmed for accessing data-items from a matrix of rows and columns, access being constrained to a moving window. A cache memory caches data for the window. The cache memory makes a location used for a first data-item from an earliest row available for reuse when the window moves along the row direction, and retrieves a second data item for a latest row of the window into the cache memory. Data for the latest row may be written into the location just made available for reuse. The position of the first data-item along the row direction of the matrix trails the position of the second data-item along the row direction of the matrix at least by the width of the window.

5 Claims, 1 Drawing Sheet

CACHE WITH ACCESS TO A MOVING TWO-DIMENSIONAL WINDOW

BACKGROUND OF THE INVENTION

1. Field of The Invention

The invention relates to a method of caching data-items for access in a sliding window. The invention also relates to a device for applying said method.

2. Description of The Related Art

U.S. Pat. No. 5,602,984 discloses a device with a cache memory for caching pixel data from a camera image. The device contains a main memory for storing the entire image and a cache memory that stores a small subset of the image. A processor addresses the cache memory with row and column (X,Y) addresses of pixels. The cache memory translates the (X,Y) address to an address inside the cache and accesses the addressed data. If data is read for a (X,Y) location that is not in the cache, the data is retrieved from memory before it is returned to the processor.

In one example, the translation of (X,Y) addresses into cache addresses involves taking the X address and compounding it with a least significant part of the Y address. The check whether the addressed data is present in the cache is performed by comparing the most significant part of the Y address with a tag stored for the X address and the least significant part of the Y address.

During image processing, access to pixels of the image is often restricted to a sliding window of pixels in the image. Such a window is scanned a number of times, step by step, along a row (X) direction, each scan for a different column (Y) position. The cache stores pixel data for a number of rows of pixels. When the window moves along a number of X positions in the row direction, only pixel data at those X positions for the latest row is not in the cache memory. This data is retrieved and replaces the data at the same X positions for the earliest row in the cache memory. Thus, it is not necessary to retrieve all data freshly from the main memory in each scan along the row direction.

SUMMARY OF THE INVENTION

Among others, it is an object of the invention to reduce the amount of cache memory that is needed for storing data when access is restricted to a moving window in the image.

The method according to the invention comprises successively scanning of the window along a row direction, each scan at a successive position along a column direction; caching data-items from a bundle of rows of data-items in a cache memory; when the window moves along the row direction, making a location used for a first data-item from an earliest cached row of the bundle available for reuse; and retrieving a second data item for a latest cached row into the cache memory, characterized in that the earliest and the latest row are the earliest and latest row of the window, the position of the first data-item along the row direction of the matrix trailing the position of the second data-item along the row direction of the matrix. By making cache addresses available for reuse at a first X position in an earliest row, when data from a second X position in a latest row is retrieved into the cache, where the first position trails the second X position, the earliest and latest row may both be in the same window. This is in contrast to U.S. Pat. No. 5,602,984, where the earliest row should be outside the window, because data is replaced at an X-position for which new data is retrieved, so that this X-position is still part of the X-position range of the window.

In one embodiment, the data for the second X position is stored at the cache address used for the data at the first X position. Thus, a minimum of cache storage is affected by the window. However, this direct replacement is not necessary: if the cache is also used for caching other data besides the data for the window, making locations available for reuse provides room for these other purposes. In this case, the invention ensures that the data needed for the window occupies a minimal part of the cache. An associative cache, a set-associative cache or a direct mapped cache may be used for this purpose. In the case of a direct mapped cache, there may, of course, still be cache conflicts with the other purposes, but the invention minimizes these conflicts.

In an embodiment of the invention, the window advances by a block of at least two rows between successive scans along rows. In this case, a first group of data-items extending over a first group of rows, is made available for reuse and a second group of data-items extending over a second group of rows is retrieved, where the first and second groups have the size of a block and extend towards each other starting from the top and bottom of the window, respectively.

When the window does not extend for an integer number of blocks in the column (Y) direction, the data-items from the first group will have been retrieved at different times as part of different second groups.

BRIEF DESCRIPTION OF THE DRAWINGS

These and other advantageous aspects of the invention will be described with respect to the accompanying drawing, in which.

DESCRIPTION OF THE PREFERRED EMBODIMENTS

Figure 1:
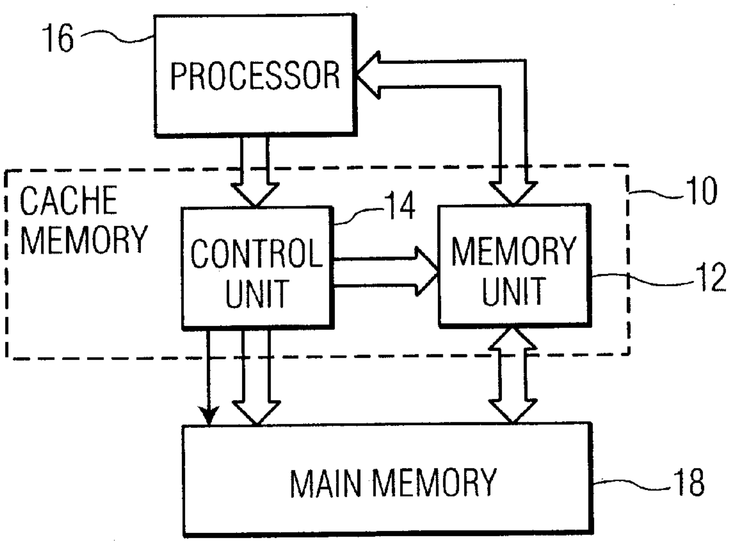
FIG. 1 shows a device containing a cache memory.

FIG. 1 shows a device containing a cache memory 10, a processor 16 and a main memory 18. The cache memory 10 contains a cache control unit 14 and a memory unit 12. The processor 16 has an address output and a data input/output. The address output is coupled to the cache control unit 14. The cache control unit 14 has a local address output coupled to the memory unit 12 and an address and control output coupled to main memory 18. The memory unit 12 has a first data input/output coupled to the data input/output of the processor 16 and a second data input/output coupled to main memory 18.

In operation, pixel data for an image (e.g., a camera image received in a television apparatus) is stored in main memory 18. The processor 16 processes this pixel data. In case the processor 18 has to read pixel data, the processor 18 generates memory addresses that address pixel data. Cache control unit 14 receives these addresses, determines the address where the data is stored in cache memory unit 12, and applies that address to memory unit 12, which supplies the pixel data to the processor 16.

If the addressed data is not stored in memory unit 12, cache control unit 14 addresses the main memory 18, which returns the data to the memory unit 12, which, in turn, passes the data to the processor 16 and stores the data at an address indicated by the cache control unit 14. After storing this data in the memory unit 12, the data that was previously stored at this address in the memory unit is no longer available from the memory unit 12.

An image is represented in memory as a collection of pixel-data associated with respective (x,y) coordinates.

Typically, the address A where pixel data associated with coordinates (x,y) is stored can be expressed as $$A=A0+F*(x+LX*y),$$

where A0 is a base address, LX is the size of the image in the X direction and F is the number of address locations occupied per pixel.

Many image processing programs access pixel data in a sliding window of pixels. Such a window has a size of, for example, 8 pixels vertically (in the y-direction) and 8 pixels horizontally (in the x-direction). Access to the image for one specific purpose in a program is restricted to the pixels in the window at any one time. During processing, the window is scanned over the image, typically in successive horizontal scans from left to right over the image, the y-position of the window incrementing from one scan to the next.

Figure 2:
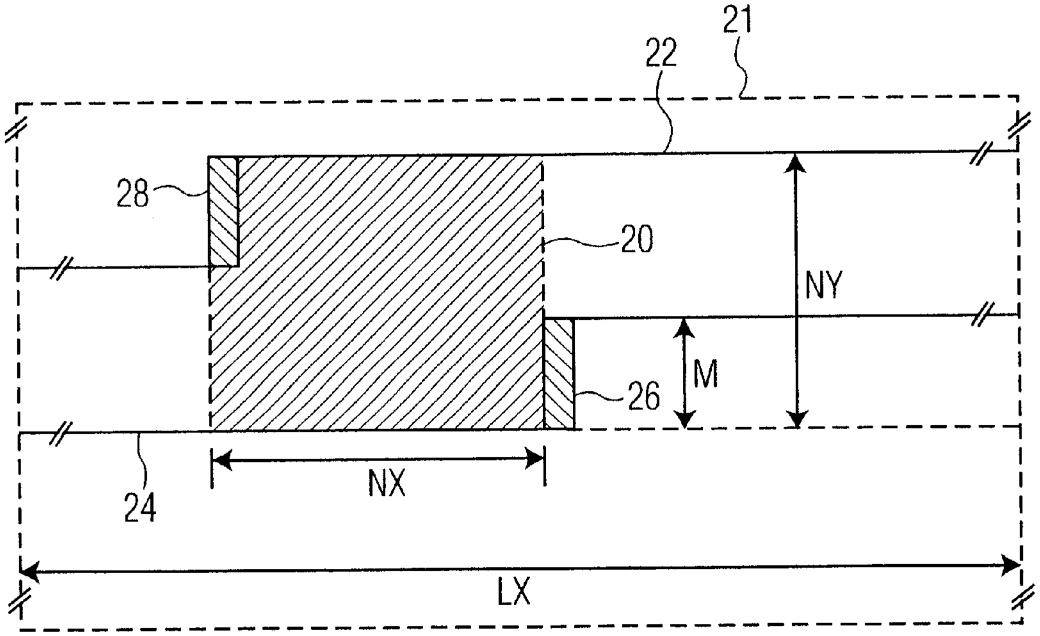
FIG. 2 shows an example of a window.

FIG. 2 shows an example of a window 20 in an image 21. The window 20 is NX pixels wide in the x-direction and NY pixels high in the Y direction. After completion of each scan (when the window reaches the right boundary of the image 21), the window is moved M pixels down in the Y direction.

In an example of an algorithm for finding motion vectors for compression of the image, the algorithm compares the pixels from a 4×8 (NX=4, NY=8) block of pixels with pixels from a window of 56×10 pixels (NX=56, NY=10). Thus, at a given position of the 4×8 block, access to the image is limited to a 10×56 window. After considering one 4×8 block, a new block is considered, 8 positions in the x-direction to the right of the old block. This involves access to pixels in a window that is 8 positions to the right of the old window. This is repeated a number of times so that the window is scanned along the x-direction. After each scan, the window is moved a block of M=4 down and the process is repeated.

In the device, pixel data from NY rows of pixel data is validly stored in the cache memory 12, be it that a number of those rows is not complete in the cache memory 12. That is, the cache memory 12 contains valid pixel data from as many rows of pixels from the image 21 as there are rows in the window 20, from the earliest row 22 in the window 20 to the latest row 24 in the window 20.

When the window is moved in the x-direction, only the pixel data for the lower right corner 26 of the window 20 is not yet in the cache memory 12. This concerns data for M rows from the image, i.e., as many rows as the window is moved down between two horizontal scans. The data for pixels in these rows at x-positions at the right of the window 20 will be retrieved when the window moves. At the same time, it is known that the data for M rows at the upper left corner 28 of the window will not be accessed any more. Hence, the memory locations in the memory unit 12 of the cache 10 that are used for the data from the rows at the upper left corner may be made available for storing other data from main memory 18.

Thus, addresses used to store pixel data from a number of rows in the same column of the image will be made available for reuse. Note, that for all but the upper row, these addresses will be made available for reuse before all of the cache addresses used for pixel data from preceding rows have been made available for reuse.

The data loaded into cache memory 10 for the lower left corner, in turn, will be no longer needed after the window 20 has advanced downward over (NY−M) rows and to the right over NX columns of the image. At that time, the memory addresses in memory unit 12 can again be made available for reuse to store other data.

In case (NY−M) is not an integer multiple of M (the block size with which the window 20 is moved down after each horizontal scan), a first part of the different cache addresses that are used in the same scan to load data for different rows in the lower right corner will be made available for reuse during a first horizontal scan. A second part of these different cache addresses will be made available during a second horizontal scan that follows the first scan. In particular, when i*M<NY−M<(i+1)*M (i integer), the addresses used for the upper NY−M−i*M pixel rows at the lower right corner of the window 20 will be made available for reuse i scans after loading and the addresses used for the remaining rows will be made available for reuse i+1 scans after they were loaded.

Preferably, the locations made available (used for data at the upper left corner of the window 28) are used for the data for the locations at the lower right corner 26 of the window. This means that data for pixels that are displaced from one another by a vector (NX,NY) will be stored at the same address in cache memory 10. In this case, the cache control unit 14 must translate the main memory addresses for these locations to an appropriate address in memory unit 12. From the X,Y coordinate of a pixel in the image, for example, the cache control unit 14 may compute a cache address Acache from $$\text{Acache}=B0+F*\{(X+LX*Y)\text{mod}(NX+(NY-M)*LX)\}$$

(B0 is a base address and "mod" is the modulo function: if a=n mod m then a is a number greater than or equal to zero and less than m so that n=a+m*i, i being an integer). With such an address computation, the cache addresses for column of M pixels at the upper left of the window 20 will be the same as the cache address for a column of M pixels at the lower right of the window 20.

In terms of the main memory address Amain of the pixel data (where Amain=A0+F*(X+LX*Y)), the cache control unit 14 can compute the cache address according to $$\text{Acache}=B0+(\text{Amain}-A0)\text{mod}F*(NX+(NY-M)*LX)$$

However, because it is known that the window 20 is scanned in small steps, the cache control unit does not need to compute the "mod" function anew each time. If it is known that the main memory address Amain(UL) of pixel data in the upper left corner of the window 20 is given by $$\text{Amain(UL)}-A0=C0+(\text{Amain(UL)}-A0)\text{mod}F*(NX+(NY-M)*LX)$$

then the cache addresses Acache(XY) for the other pixel coordinates XY in the window are given by $$\text{Acache}(XY)=(\text{Amain}(XY)-A0)+D$$

where $$D=C0 \text{ if Amain}(XY)-A0<C0+F*(NX+(NY-M)*LX)$$

$$D=C0-F*(NX+(NY-M)*LX)$$

otherwise

F*(NX+(NY−M)*LX) is a fixed number for all pixels. As a result, Acache can be computed using additions and/or subtractions and a test whether the first or the second value for D should be used. Each time the window 20 is advanced, C0 should be predetermined, but this also requires only additions and/or subtractions plus a test. Consequently, the computation of Acache in the cache control unit 14 can be implemented using simple arithmetic circuits.

In preparation for scanning the window 20 along the image 21, the processor 16 sends the cache control unit 14 information about the image size, the window size (NX,NY)

and the block size (M) by which the window 20 is advanced, between successive scans. For example, the processor may send F*(NX+(NY−M)*LX) to the cache control unit 16, together with information about the base address A0. The cache control unit 14 uses this information to control reuse of addresses in the cache memory. Of course in a dedicated processor, where these numbers are always the same, programming of the cache control unit 14 can be fixed in advance.

Conversion of the addresses to addresses for the memory unit 12 may be performed by the processor 16 instead of by the cache control unit 14.

Instead of addressing the pixels in the window 20 by their memory address, the processor 16 can also address the pixels by their position relative to the window. In this case, the address computation is similar, but with different offsets.

In one embodiment, the processor 16 explicitly signals movement of the window 20 to the cache control unit, so that the cache control unit can retrieve the pixel data for the lower right corner 26 and make the addresses for the upper right corner 28 available for reuse. Alternatively, the cache control unit 14 may detect addressing of pixels in the lower right corner 26 and respond to that detection by making addresses from the upper left corner available for reuse and retrieving data. In yet another alternative, the cache control unit 14 may pre-retrieve data for pixels to the right of the lower right corner 26 upon detection of addressing of the pixels in the lower right corner 26 or explicit signalling of movement of the window 20. Thus, the processor 16 will not encounter cache misses.

Instead of placing the data for the lower right corner 26 in the memory unit 12 at the addresses of the upper right corner, the cache control unit 14 may merely mark these addresses as "available for reuse" so that these addresses may be used for caching other data (e.g., not from the image) or for other processes running in parallel with the process that uses the window. In this case, one preferably uses an associative cache or an n-way set associative cache. The invention makes it possible to occupy a minimum of space in the cache with the window.

Of course, the invention is not limited to the specific window and block size displayed in FIG. 2, or to scanning from left to right of the image and then from bottom to top. This will affect the data that is made available for reuse in an obvious way. For example, scans that load pixel data from memory from right to left in the image may be used (addresses for pixels from a vertical block in the upper right corner made available for reuse), or scans from bottom to top displaced from one another from right to left (addresses for pixels from a horizontal blocks in the upper left corner made available for reuse).

Although the invention has been described for reading from the cache memory 10, the invention can also be used in case the processor 16 writes to the cache memory. When the processor 16 writes to cache memory 10, the cache control unit 14 may follow a "copy back" strategy, that is, it may write back data from an address in the cache memory unit 12 to main memory 18 when that address is made available for reuse, in particular, if that address has been overwritten by the processor 16. When the window 20 is moved, the cache control unit 14 therefore writes back pixel data for a number of rows 28 in the upper left corner of the window 20, before reusing these addresses, for example, for the pixels at the lower right corner 26 of the window 20.

What is claimed is:

1. A device comprising:

a processor programmed for accessing data-items from a matrix of rows and columns of data-items, access being constrained to a window that is moved in successive scans along a row direction of the matrix of rows and columns of data-items, each scan at a successive position along a column direction of the matrix of rows and columns of data-items; and a cache memory for caching data-items from a bundle of rows of data-items, the cache memory comprising control means for making a location used for a first data-item from an earliest cached row of the bundle available for reuse when the window moves along the row direction, and for retrieving a second data item for a latest cached row into the cache memory, characterized in that an earliest and a latest row in the cache memory are the earliest and latest row of the window, a position of the first data-item along the row direction of the matrix trailing a position of the second data-item along the row direction of the matrix.

2. The device according to claim 1, wherein the second data-item replaces the first data-item in the cache memory.

3. The device according to claim 1, wherein when the processor advances the window between directly successive scans, the processor advances the window in a column direction of the matrix by a block of at least two rows at a time, the control means making a first group of locations, used for first data-items from an earliest group of at least two cached rows of the bundle, available for reuse, and retrieving second data items for a latest group of at least two cached rows into the cache memory, where the earliest and latest group have the size of a block and extend towards each other starting from a top and bottom of the window, respectively.

4. The device according to claim 3, wherein a height of the window is not an integer factor of a height of the block.

5. A method of caching data-items for access that is restricted to a sliding window of data-items from a two-dimensional matrix of rows and columns of data-items, the method comprising the steps:

successively scanning the window along a row direction in the matrix of rows and columns of data-items, each scan at a successive position along a column direction in the matrix of rows and columns of data-items;

caching data-items from a bundle of rows of data-items in a cache memory; and when the window moves along the row direction in the matrix, making a location used for a first data-item from an earliest cached row of the bundle available for reuse, and retrieving a second data item for a latest cached row into the cache memory, characterized in that an earliest and a latest row in the cache memory are the earliest and latest rows of the window, a position of the first data-item along the row direction of the matrix, trailing a position of the second data-item along the row direction of the matrix.

* * * * *